Aug. 16, 1960  T. L. BARBEE  2,949,213
DRAINAGE PAN
Filed Nov. 2, 1956

*INVENTOR*
THOMAS L. BARBEE
BY Arthur H Robert
*ATTORNEY*

United States Patent Office 2,949,213
Patented Aug. 16, 1960

2,949,213

DRAINAGE PAN

Thomas L. Barbee, 329 Zorn Ave., Louisville, Ky.

Filed Nov. 2, 1956, Ser. No. 620,067

8 Claims. (Cl. 222—160)

This invention relates to an improved drain pan which is particularly intended for use in draining automobile radiators, crank cases and the like although not limited thereto.

It is conventional practice to drain the contents of an automobile cooling system into an upwardly open horizontally elongate vertically shallow drain pan. Such a pan, when loaded with contents of the cooling system, has considerable dead weight. It is not only heavy to lift but it requires the person lifting it initially to assume a relatively awkward off-balanced position in which he is subjected to over exertion and possible injury. When lifted, the pan is awkward to handle and difficult to carry without splashing or spilling its contents.

The principal objects of my invention are: to overcome these and other known disadvantages; to provide an improved drain pan arrangement which may be easily and quickly moved along the floor, raised, lowered and emptied; and to accomplish these objectives in a simple design which is inexpensive to manufacture and easy to operate and very sturdy in operation.

In accordance with my invention, a drain pan, of conventionally long and shallow dimensions, is pivotally mounted upon a frame for movement from a low position to a relatively high position. In its low position, the pan can be easily moved to a drain-receiving location underneath an automobile radiator or the like. When the drainage operation is completed, it can be easily and quickly removed from underneath the automobile and then just as easily and quickly swung to its raised position. In its raised position, it can be easily and quickly drained into a bucket or other container which is more convenient to handle than the pan and which may be used to store the drainage or transport it for storage, dumping or other purposes.

A presently preferred embodiment of my invention is illustrated in the accompanying drawing, wherein.

Figure 1:
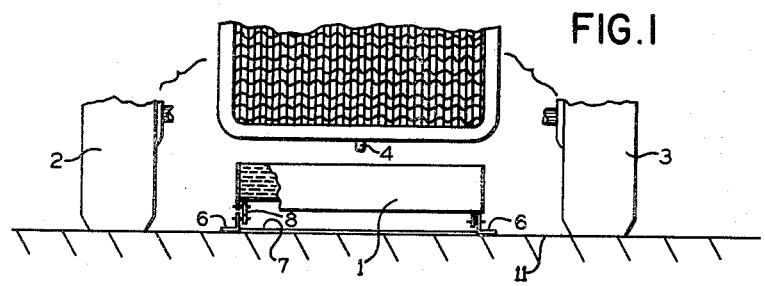
Fig. 1 is an end elevation of the pan in its low drain-receiving position underneath an automobile radiator.
Figure 2:
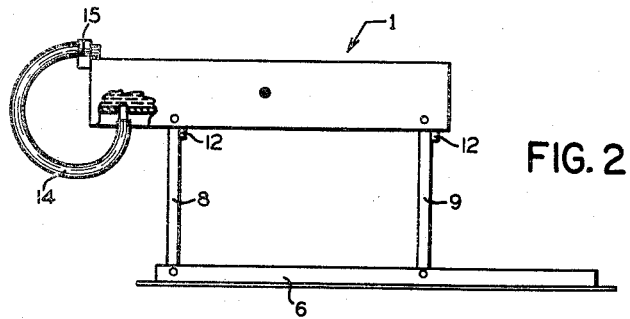
Fig. 2 is a partly broken side elevational view of the pan in a relatively elevated position.
Figure 3:
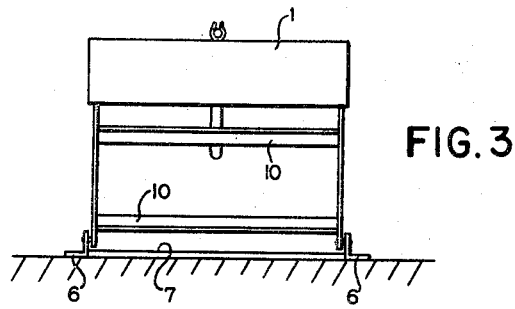
Fig. 3 is an end elevation of the elevated pan as shown in Figure 2.
Figure 4:
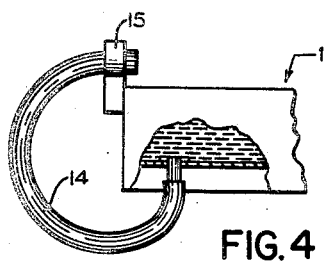
Fig. 4 is a detail view of one corner of the pan as it appears in Figure 2.

The drainage pan arrangement illustrated in the drawing comprises: a drain pan; a frame; and means mounting the pan on the frame.

The drainage pan 1 is of conventional structure, being horizontally elongate and vertically shallow. Its dimensions are such magnitude as will provide it with a capacity preferably somewhat greater than that represented by the entire contents of the largest automobile cooling system with which it is normally intended to be used. As shown in Figure 1, the pan 1 is positioned between the wheels 2 and 3 of a conventional automobile to receive drainage from the radiator drain cock 4.

The frame is preferably made horizontally elongate and vertically shallow so that it has stability. While it may be constructed in any suitable manner, it need comprise nothing more than a pair of laterally spaced horizontally elongate angle irons 6 having a length preferably greater than that of the pan. Its width preferably is slightly smaller than that of the pan so that the pan may rest upon the upper faces of the angle irons 6. Again, to promote stability, the angle irons 6 are connected to each other rigidly by suitable cross members 7. These may be in the form of side straps, angle irons or other conventional bracing members.

The mounting means comprises a pair of front legs 8 and a pair of rear legs 9 pivotally connecting the pan 1 to the angle irons 6. The front legs 8 are pivotally connected at their stationary end to the front end of the angle irons 6 of the frame and at their swinging ends to the sides of the pan 1 at points located about ⅓ of the length of the pan rearwardly from the front end of the pan. The rear legs 9 are connected pivotally at their swinging ends to the sides of the pan 1 adjacent its rear end while their stationary ends are connected pivotally to the frame 6 at points located about ⅓ of the length of the frame forwardly from the rear end thereof. Each pair of legs 8 and 9 is reinforced by a pair of upper and lower cross members 10 extending from one leg to the other and rigidly secured to both.

With this arrangement, the pan, when moved to its low drain-receiving position, will rest upon the angle irons 6 with its front end spaced a small distance rearwardly from the front end of the frame and with its rear end spaced slightly forwardly from the rear end of the frame. In this position, the frame and the pan cooperate to form a unit which is horizontally elongate and vertically shallow. This unit may be readily slid along the floor and, since it is vertically shallow, it may be readily moved underneath the automobile even the ones having the minimum road clearance. As a consequence, it is a simple matter to locate this collapsed unit underneath an automobile in position to receive the drainage from an automobile radiator.

After a particular drainage operation is completed, it is a simple matter to slide the unit forwardly, if necessary to clear the automobile, and then, while holding the frame 6 against further movement, swing the drain pan upwardly to its elevated position. In moving to this position the legs 8 and 9 swing through and slightly beyond their vertical centers and there engage stops 12 which hold them in their pan-elevating position. In this position, the front end of the pan projects forwardly from the upper ends of the front legs 8. Consequently the bottom of the pan in this projecting area is more accessible than it would otherwise be.

The elevated position of the pan and the accessibility of its front end makes it an easy matter to drain the pan into a bucket or other like container which is more conveniently handled. To facilitate the drainage of the elevated pan, a hose 14 is connected at one end to a suitable opening in the bottom of the pan while a clip 15 is mounted on the front end of the pan to hold the discharge end of the hose in a non-draining position until drainage is desired. At this time, it is a simple matter to remove the discharge end of the hose 14 from the clip 15 and direct it into the drain-receiving bucket.

To facilitate the movement of this unit along the floor, it may be provided with rollers which are not shown. In each position of the pan, its center of gravity lies intermediate the connection of legs 8 and 9 with the frame 6 which, of course, promotes the stability in the structure.

Having described my invention, I claim:

1. A drainage-receiving unit of the type intended to be moved along the floor into and out of the space between the floor and the lower drain cock of an automobile, comprising: an upwardly open drain pan, which is relatively elongate horizontally and shallow vertically; drainage means on said pan for draining its contents; means for maintaining said drainage means normally inoperative; a frame, which is relatively elongate horizontally and shallow vertically; and means mounting said pan on said frame for movement from a low drainage receiving position, wherein the frame and pan cooperate to form a unit which is relatively elongate horizontally and shallow vertically, to a relatively high drainage discharge position, in which the pan is spaced upwardly from the frame, said mounting means supporting said pan in the same relative horizontal position during said movement.

2. The unit of claim 1, wherein: said mounting means includes a plurality of legs pivotally connecting the pan to the frame.

3. The unit of claim 2 wherein: said legs are swingable upwardly from a horizontally extending position to a vertically extending position on the other side of their dead centers as the pan is moved from its low to its high position.

4. The unit of claim 3 including: a stop for limiting the movement of said legs on said other side of their vertical dead center in a direction away from their vertical dead center.

5. The unit of claim 2 wherein: the center of gravity of said pan, in each of its low and high positions, is intermediate the ends of said frame.

6. The unit of claim 2 wherein: said plurality of legs are substantially equal in length, are pivoted at their opposite ends respectively to said pan and said frame about parallel axes and include at least three legs with one offset from a plane passing through the axes of the other two legs.

7. The unit of claim 6 wherein: said plurality of legs includes two pairs with each pair being arranged on an opposite side of said pan from the other pair.

8. The drainage-receiving unit of claim 1 wherein: said drainage means is in the form of a tubular conduit connected at one end to a drainage opening in said pan; and said maintaining means is normally operative to hold the conduit so that its discharge passageway extends upwardly to an extent preventing gravitational drainage.

References Cited in the file of this patent

UNITED STATES PATENTS

| | | |
|---|---|---|
| 285,967 | Chapman | Oct. 2, 1883 |
| 557,274 | Kade | Mar. 31, 1896 |
| 949,398 | Menzl et al. | Feb. 15, 1910 |
| 1,290,036 | Anderson | Jan. 7, 1919 |
| 1,411,812 | Smith | Apr. 4, 1922 |
| 1,506,028 | Perritt | Aug. 26, 1924 |
| 1,535,698 | Swanson | Apr. 28, 1925 |
| 1,559,792 | Seabold | Nov. 3, 1925 |
| 1,628,504 | Louis | May 10, 1927 |
| 1,961,394 | Rothe | June 5, 1934 |
| 2,111,715 | Winfree | Mar. 22, 1938 |